(12) United States Patent
Taneda et al.

(10) Patent No.: US 6,218,658 B1
(45) Date of Patent: Apr. 17, 2001

(54) OPTICAL FUSE

(75) Inventors: Yasuhisa Taneda; Takaaki Ogata; Hirotoshi Nagata; Junichiro Ichikawa; Kaoru Higuma, all of Tokyo (JP)

(73) Assignees: NEC Corporation; Sumitomo Osaka Cement Co., Ltd., both of Tokyo (JP)

( * ) Notice: Subject to any disclaimer, the term of this patent is extended or adjusted under 35 U.S.C. 154(b) by 0 days.

(21) Appl. No.: 09/271,302

(22) Filed: Mar. 17, 1999

(30) Foreign Application Priority Data

Mar. 19, 1998 (JP) .................................................. 10-070751
Mar. 30, 1998 (JP) .................................................. 10-084027

(51) Int. Cl.⁷ .............................. H01J 40/14; G02B 26/00
(52) U.S. Cl. .......................... 250/216; 250/229; 359/297
(58) Field of Search ..................................... 250/221, 216, 250/229, 230, 231.1; 359/237, 238, 240, 290, 297

(56) References Cited

U.S. PATENT DOCUMENTS 4,933,929 * 6/1990 Tajima ...................................... 370/3
5,017,769 * 5/1991 Cohn et al. ........................... 250/216

FOREIGN PATENT DOCUMENTS

| 64-500234 | 1/1989 | (JP) . |
| 1-500778 | 3/1989 | (JP) . |
| 1-117380 | 5/1989 | (JP) . |
| 4-155937 | 5/1992 | (JP) . |
| 9-146056 | 6/1997 | (JP) . |

* cited by examiner

Primary Examiner—Huy Mai
(74) Attorney, Agent, or Firm—Sughrue, Mion, Zinn, Macpeak & Seas, PLLC

(57) ABSTRACT

The optical fuse of the present invention comprises: at least one light heatable portion for receiving an incident beam, and at least one thermally sensitive degradable portion with transparency and reflectivity, positioned in contact with the light heatable portion. The light heatable portion contains a light heatable material which generates heat depending on a specified light intensity of the incident beam. The thermally sensitive degradable portion contains a thermally sensitive degradable material which loses or reduces its transparency and reflectivity, depending on the heat generated by the light heatable portion when the light intensity of the incident beam exceeds a threshold value.

20 Claims, 10 Drawing Sheets

OPTICAL FUSE

BACKGROUND OF THE INVENTION

1. Field of the Invention

The present invention relates to an optical fuse, an optical fuse complex, and an optical fuse system using the optical fuse, which prevents damage to a light receiver such as a photo detector by immediately intercepting a beam in response to an unexpectedly high intensity entering an optical system.

This application is based on Japanese Patent Applications Nos. 10-070751 and 10-084027, the contents of which are incorporated herein by reference.

2. Description of the Related Art

Rare earth element doped optical fiber amplifiers, which can extend transmission distances by directly amplifying a signal beam, have been indispensable for a long distance mass communication system. These rare earth element doped optical fiber amplifiers excite the rare earth element doped in an optical fiber with pumping light at wavelengths shorter than the wavelengths of the signal beam to be transmitted, and amplify the signal beam by induced emission.

These rare earth element doped optical fiber amplifiers may damage or deteriorate a subsequent optical device on a light path because of the high power output, thus lowering the stability and reliability of the optical communication system.

In particular, when going from a no signal condition to an input of the signal beam, a secondary pulse which contains a high intensity light component (hereinafter referred to as "light surge") may damage the optical device.

The light surge occurs for the following reason. When no external beam is input, the rare earth element doped optical fiber amplifier has been excited by excitation light at wavelengths shorter than those of the signal beam. Because the rare earth element has been excited, light energy is stored in the rare earth element doped optical fiber amplifier. When the signal beam is input to the rare earth element doped optical fiber amplifier, the energy stored in the rare earth element doped optical fiber amplifier is suddenly output by the induced emission, thus amplifying the signal beam by a light gain.

A technique for suppressing the light surge has been proposed. Japanese Patent Application, First Publication No. 6-216452 notes the cause of the light surge and discloses a technique for making the gain constant even when a signal beam is input to the rare earth element doped optical fiber amplifier in which energy has been stored.

The light surge occurs because of the sudden induced emission of the energy stored in the rare earth element doped optical fiber amplifier. When no signal beam is input, the technique inputs a dummy beam at wavelengths different from those of the signal beam, making the intensities of the signal beam and the dummy beam equal and preventing the light surge.

FIG. 22 is a block diagram showing the structure of the background art of Japanese Patent Application, First Publication No. 6-216452. An optical multiplexer 201 multiplexes the dummy beam (wavelength: $\lambda3$) with the signal beam (wavelength: $\lambda1$). A optical branching device 205 branches a part of the transmitted power, and a receiver 204 performs optical/electric conversion (O/E conversion). A dummy beam semiconductor laser emission controller 203 performs feedback to a dummy beam semiconductor laser 202 so as to set the voltage after the O/E conversion to a fixed value.

The light multiplexer 206 multiplexes the multiplexed beam and excitation beam (wavelength: $\lambda2$) emitted by the excitation semiconductor laser. The second multiplexed beam enters the rare earth element doped optical fiber amplifier 210 through an optical isolator 209, and is amplified during the transmission through the rare earth element doped optical fiber amplifier 210. The beam from the rare earth element doped optical fiber amplifier 210 travels through a second optical isolator 211. An optical filter 212 allows only the signal beam $\lambda1$ to travel.

Although this technique prevents generation of light surges without interception of the signal beam, the technique cannot protect an optical device once a light surge accidentally occurs. In particular, the number of the rare earth element doped optical fiber amplifiers has increased recently. In systems using this technique, all the amplifiers require structures for emitting and controlling the dummy beam, thus increasing the costs.

Japanese Patent Application, First Publication No. 9-146056 discloses an optical fuse and a method for suppressing light surges, in which a semiconductor device with an optical waveguide (for example, a compound semiconductor) or a rare earth element doped optical fiber is inserted in a post stage of the rare earth element doped optical fiber. The compound semiconductor optical waveguide device deteriorates by the light surge. That is, because the semiconductor absorbs light, the end of the waveguide generates heat, and burns out instantaneously. With this characteristic, the device works as an optical fuse for a light surge. The device is advantageous because the absorption wavelength band or threshold value of the absorption may be adjusted by controlling the combination of materials (solid solution composition, or a super lattice cycle). However, there is the problem that the number of the semiconductor waveguide device which may be damaged increases the costs of systems.

Japanese Patent Application, First Publication No. 9-146056 discloses a process for connecting a rare earth element doped optical fiber using light absorption caused by transitions of inner electrons of a rare earth element such as Er. The process produces a device which undergoes reversible destruction. Other similar reports which describe absorption of light of a high intensity using rare earth elements, in particular, Er are available. In recent examples, "Y. Maeda, Appl. Phys. Lett., Vol. 72 (4), 1–3" (1998) discloses that, in a wavelength band of 790 nm, low intensity light is not absorbed but high intensity light is effectively absorbed by lutetium aluminum garnet doped with Er. This phenomenon is strongly related to transition probability and relaxation probability of electron levels of Er ion. Depending on the number of electrons at a specified level (for example, in an $I_{13/2}$ condition of Er), the absorption wavelength band may be controlled. The control may be achieved by adjustment of atom positions of the rare earth element in a matrix material (amorphous $SiO_2$ in an optical fiber, or garnet), excitation of the electrons by temperature control, or control of the transition probability and relaxation probability. To perform these processes, high material design technology is needed, increasing the costs of the products. Further, the optical system may cause a problem at low temperatures at which electrons are not present in a preselected wavelength band.

Japanese Patent Application, First Publication No. 9-244074 discloses a light limiter circuit which includes an optical non-linear element whose transparency loss is changed depending on the intensity of an incident beam. The reference does not provide detailed description of the elements which perform the light limiting operation of the main point of the circuit. The optical limiting element using a non-linear optical material may utilize a process applying Cherenkov radiation, which is a non-linear effect, or a process applying parametric amplification which is another non-linear effect. These processes provide a non-destructing-type (reversible-type) device suppressing a light surge. However, the non-linear optical constant is small, depending on the preselected wavelength band, and it is necessary to extend the length of the element (the length of the waveguide) to compensate for insufficient effects. Therefore, the size and costs of the device cannot be reduced when a number of devices suppressing light surges are employed.

As described above, there are three kinds of methods for suppressing light surges: (a) the method for directly preventing generation of light surges; (b) a method using the reversible physics in response to only a light surge (high intensity beam); and (c) the method using the device whose material is damaged by the light surge. A disposable optical fuse which reduces the costs according to the method (c) has recently been in demand.

BRIEF SUMMARY OF THE INVENTION

It is therefore an object of the present invention to provide an optical fuse, an optical fuse complex, and an optical fuse system using the optical fuse, which makes the device simple and inexpensive.

In order to accomplish the above object, the optical fuse comprises at least one light heatable portion for receiving an incident beam, and at least one thermally sensitive degradable portion with transparency or reflectivity, positioned in contact with the light heatable portion. The light heatable portion contains a light heatable material which generates heat depending on a specified light intensity of the incident beam. The thermally sensitive degradable portion contains a thermally sensitive degradable material which loses or reduces its transparency or reflectivity, depending on the heat generated by the light heatable portion when the light intensity of the incident beam exceeds a threshold value.

The light heatable material may be a metal or semiconductor, and the thermally sensitive degradable material is a dielectric. The light heatable portion and the thermally sensitive degradable portion may be films, and may be alternately layered, forming an integrated layered film body. The light heatable portions may be a plurality of spots, and may be patterned on the film thermally sensitive degradable portion. The light heatable portions may be a plurality of strips, and may be patterned on the film thermally sensitive degradable portion. The light heatable portion may be a film with a specified pattern, and may be patterned on the film thermally sensitive degradable portion. The light heatable portions may be a plurality of particles distributed in the thermally sensitive degradable portion.

In another aspect of the present invention, the optical fuse comprises: a dielectric metal compound containing metal atoms and an organic group combined therewith and having transparency and reflectivity. The metal atoms generate heat depending on a specified light intensity of an incident beam, degenerating or decomposing the dielectric metal compound so as to lose or reduce its transparency and reflectivity.

The optical fuse complex of the present invention includes the optical fuse supported on a base. In the optical fuse system of the present invention, the light heatable portion of the optical fuse faces a means for transmitting an input beam, and the thermally sensitive degradable portion of the optical fuse faces a means for transmitting output beam. Alternatively, the light heatable portion of the optical fuse may face both a means for transmitting an input beam and a means for transmitting an output beam.

In another aspect of the present invention, the optical fuse system, comprises: a light input device for inputting a beam; an optical fuse inclined with respect to an optical axis of the beam input from the light input device at a predetermined angle, the transparency and the reflectivity of the optical fuse being changed irreversibly depending on the intensity of the beam; a light output device for outputting the beam transmitted through the optical fuse; and a photo detector for detecting the beam reflected by the optical fuse, wherein, when the intensity of the beam exceeds a predetermined value, the transparency of the optical fuse is reduced so as to intercept the beam, and the photo detector detects change in the intensity of the beam caused by change in reflectivity of the optical fuse to determine whether the beam is intercepted.

In another aspect of the present invention, the optical fuse system, comprises: a light input device for inputting a beam; an optical fuse inclined with respect to an optical axis of the beam input from the light input device at a predetermined angle, the transparency and the reflectivity of the optical fuse being changed irreversibly depending on the intensity of the beam; a light output device for outputting the beam reflected by the optical fuse; and a photo detector for detecting the beam transmitted through the optical fuse, wherein, when the intensity of the beam exceeds a predetermined value, the reflectivity of the optical fuse is reduced so as to intercept the beam, and the photo detector detects a change in the intensity of the beam caused by the change in transparency of the optical fuse to determine whether the beam is intercepted.

In another aspect of the present invention, the optical fuse system, comprising: a light input device for inputting a beam; an optical fuse whose transparency is changed irreversibly depending on the intensity of the beam; a light output device for outputting the beam transmitted through the optical fuse; at least one photo coupler provided between the optical fuse and the light output device; and a photo detector for detecting the beam branched by the photo coupler, wherein, when the intensity of the beam exceeds a predetermined value, the transparency of the optical fuse is reduced so as to intercept the beam, and the photo detector detects a change in the intensity of the beam caused by the change in transparency of the optical fuse to determine whether the beam is intercepted.

In another aspect of the present invention, the optical fuse system, comprising: a light input device for inputting a beam; an optical fuse inclined with respect to an optical axis of the beam input from the light input device at a predetermined angle, the reflectivity of the optical fuse being changed irreversibly depending on the intensity of the beam; a light output device for outputting the beam reflected by the optical fuse; at least one photo coupler provided between the optical fuse and the light output device; and a photo detector for detecting the beam branched by the photo detector, wherein, when the intensity of the beam exceeds a predetermined value, the reflectivity of the optical fuse is reduced so as to intercept the beam, and the photo detector detects a change in the intensity of the beam caused by the change in reflectivity of the optical fuse to determine whether the beam is intercepted.

In the optical fuse system, the optical fuse may be a film formed by depositing a dielectric material onto a glass substrate.

DETAILED DESCRIPTION OF THE INVENTION

First Embodiment

The optical fuse of the first embodiment according to the present invention includes at least one light heatable portion for receiving the incident beam, and at least one thermally sensitive degradable portion with transparency or reflectivity. The light heatable portion contains a light heatable material which is degraded, converted, or decomposed, and generates heat, depending on the specified light intensity of the incident beam. The thermally sensitive degradable portion, in contact with the light heatable portion, contains a thermally sensitive degradable material which is degraded, converted, or decomposed, losing or reducing its transparency or reflectivity, depending on the heat generated by the light heatable portion when the light intensity of the incident beam exceeds a threshold value.

The light heatable material is selected from materials which effectively absorb light and generate heat, depending on the wavelengths of the incident beam. For a beam with wavelengths of 1.3 to 1.6 $\mu$m used for optical fiber communication, the light heatable material may be aluminum (Al), palladium (Pd), cobalt (Co), molybdenum (Mo), nickel (Ni), platinum (Pt), titanium (Ti), indium (In), vanadium (V), manganese (Mn), or copper (Cu). For a beam with wavelengths around 0.85 $\mu$m, the light heatable material may be germanium (Ge), silicon (Si), or gallium (Ga).

The thermally sensitive degradable material may be an inorganic dielectric such as $SiO_2$ and $TiO_2$, or an organic dielectric such as epoxy resin and polyvinyl resin. The epoxy resin may be doped with fluorine to reduce its refractive index or with sulfur to increase its refractive index. The polyvinyl resin may be polyvinyl-alcohol.

The optical fuse of the first embodiment may be provided in a light transmission system or in a light reflection system. In the light transmission system, a pair of optical fibers for inputting and outputting the beam are provided on both sides of the optical fuse. In the light reflection system, a pair of optical fibers for inputting and outputting beam are disposed, forming a predetermined angle with respect to one surface of the optical fuse, by which the input beam is reflected. When the light intensity of the beam entering the optical fuse from the input optical fiber is within an allowable range, the optical fuse does not change, and allows transmission or reflection of the beam toward the output optical fiber, causing a small optical loss. When the light intensity of the beam is excessive, the optical fuse is immediately damaged (burns out), losing or reducing its transparency and reflectance, and thus intercepting the beam. The damaged optical fuse may be easily exchanged.

Figure 1:
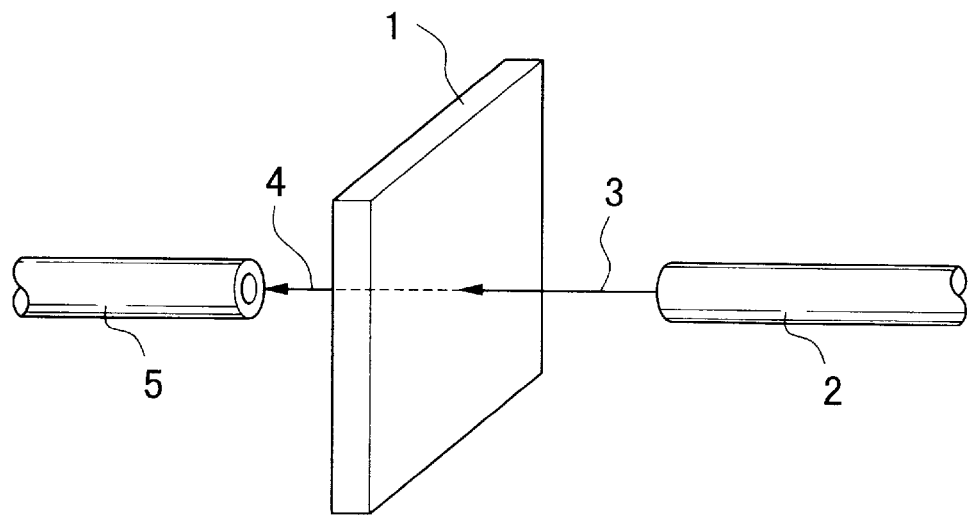
FIG. 1 is a perspective view showing the light-transmission-type optical fuse of the present invention.

Referring to FIG. 1, the optical fiber 2 is directed to the surface of the optical fuse 1 which receives incident beam 3. When the light intensity of the incident beam 3 is within an allowable range, the incident beam 3 travels through the optical fuse 1, incurring a small loss, and output beam 4 enters the optical fiber 5. When the light intensity of the incident beam 3 is excessive, the receiver of the optical fuse immediately generates heat and burns out, losing or reducing its transparency or causing diffusion, and does not allow transmission of the beam.

Figure 2:
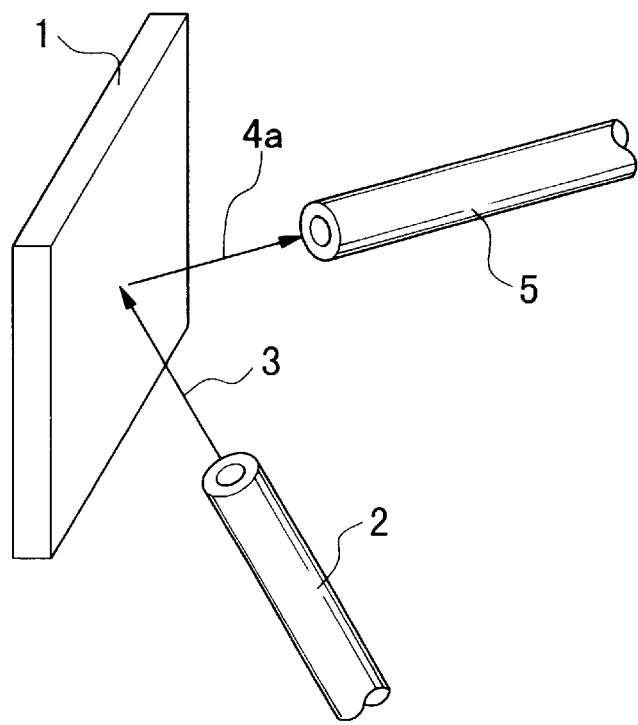
FIG. 2 is a perspective view showing the light-reflection-type optical fuse of the present invention.

Referring to FIG. 2, the incident beam 3 is transmitted through the optical fiber 2, enters the surface of the optical fuse 1, is reflected by the receiver, and then enters the optical fiber 5. When the light intensity of the incident beam is within an allowable range, the incident beam 3 is reflected by the receiver of the optical fuse 1, incurring a small loss, and reflected beam 4a is emitted toward the optical fiber 5. When the light intensity of the incident beam is excessive, the receiver of the optical fuse 1 immediately burns out, losing or reducing its reflectivity (because of diffusion), and does not allow the reflection of the beam.

Figure 3:
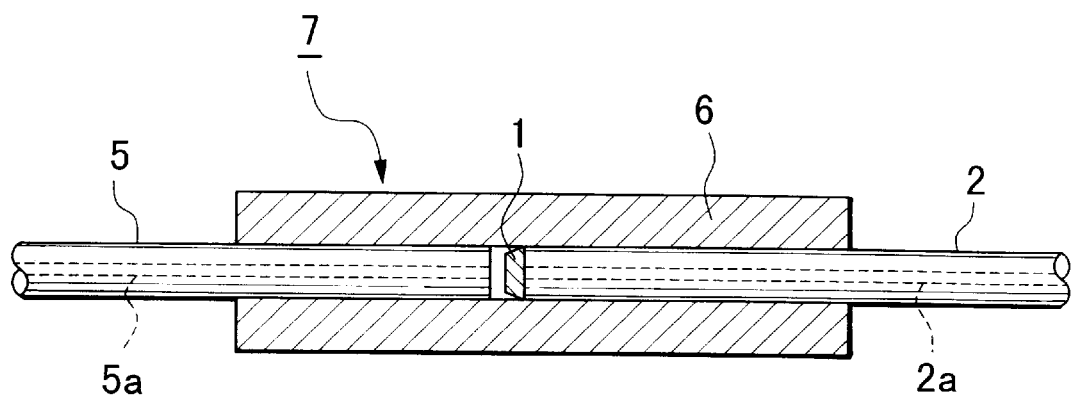
FIG. 3 is a cross-sectional view showing the optical fuse system using the optical fuse of the present invention.
Figure 4:
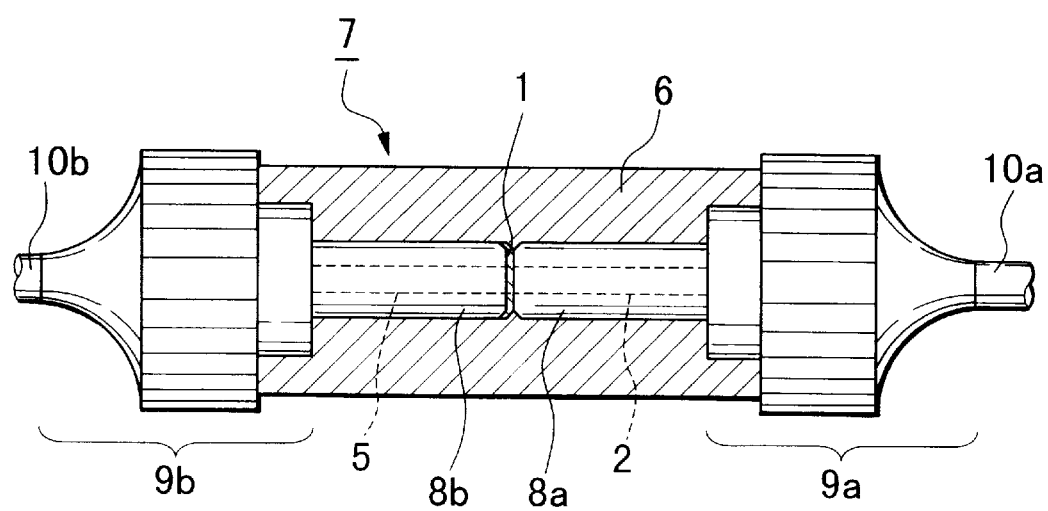
FIG. 4 is a cross-sectional view showing the other optical fuse system using the optical fuse of the present invention.

FIGS. 3 and 4 show examples of light-transmission-type optical fuse systems using the optical fuse of the present invention.

Figure 8:
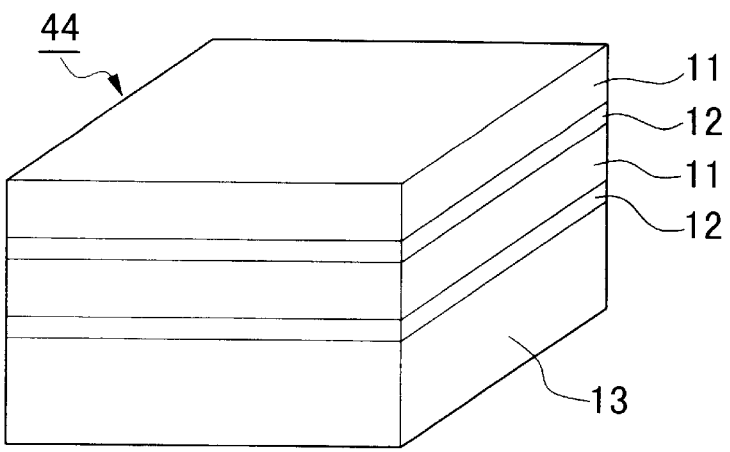
FIG. 8 is a perspective view showing a modified example of the optical fuse complex which includes the optical fuse of the first embodiment of the present invention.

In the system shown in FIG. 3, an optical fiber 2 with a fiber core 2a and an optical fiber 5 with a fiber core 5a are held within a holder pipe 6 so that their ends face each other. The optical fuse 1 of the present invention is located between the ends of the optical fibers 2 and 5. The optical fuse 1 may be attached to one of the ends of the optical fibers 2 and 5, for example, to the end of the optical fiber 5 as shown in FIG. 8.

Referring to FIG. 4, a pair of the optical fibers 2 and 5 are held by a pair of ferrules 8a and 8b, and the optical fuse 1 is attached to one of the optical fibers 2 and 5, for example, to the end of the optical fiber 5. The optical fibers 2 and 5 are held within a holder pipe 6 and are connected via fiber connectors 9a and 9b to optical fibers 10a and 10b.

To form the optical fuse on the end of the optical fiber, the optical fuse component may be formed by various appropriate processes, for example, by a deposition process such as vacuum deposition and sputtering, a coating process, or a lamination process.

Figure 5:
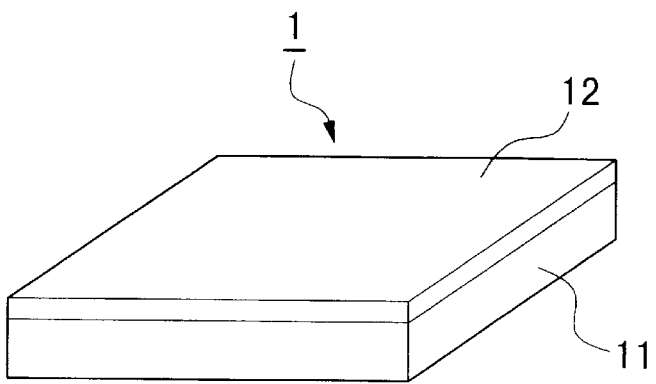
FIG. 5 is a perspective view showing the optical fuse of the first embodiment of the present invention.
Figure 6:
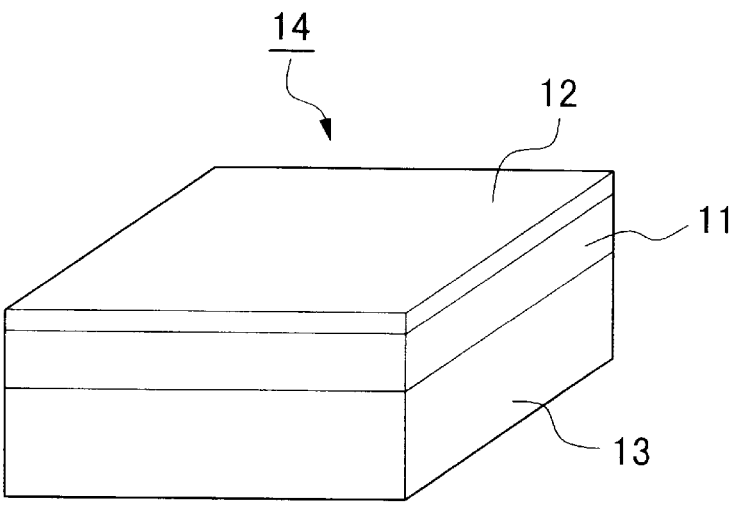
FIG. 6 is a perspective view showing the optical fuse complex which includes the optical fuse of the first embodiment of the present invention.
Figure 7:
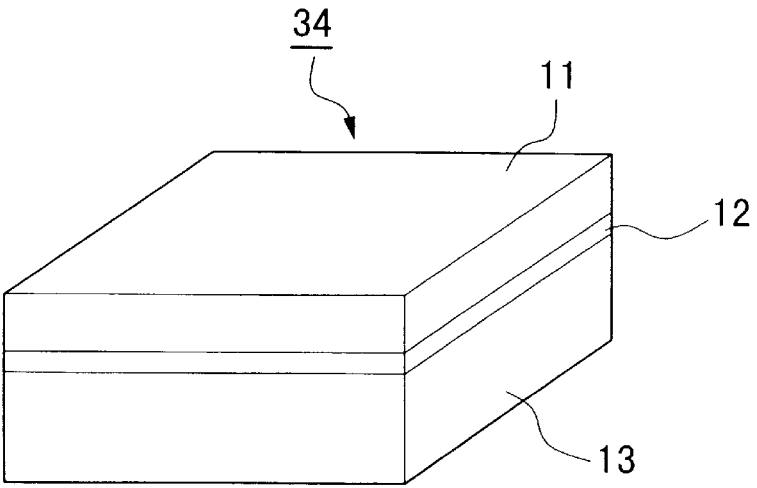
FIG. 7 is a perspective view showing a modified example of the optical fuse complex which includes the optical fuse of the first embodiment of the present invention.

Referring to FIG. 5, the optical fuse comprises a dielectric thermally sensitive degradable material layer 11 and a light heatable material layer 12 formed thereon. Alternatively, as shown in FIG. 6, the thermally sensitive degradable material layer 11 may be attached to a base 13, forming an optical fuse complex 14. As shown in FIG. 7, the light heatable material layer 12 may be attached to the base 13, forming an optical fuse complex 34.

Referring to FIGS. 5 to 7, the thickness of the thermally sensitive degradable material layer and the light heatable material layer are determined, depending on the wavelengths of the light and on the material of the optical fuse. Preferably, the thickness of the light heatable material layer is in a range of 10 to 100 nm, and more preferably, in a range of 50 to 100 nm. The thickness of the thermally sensitive degradable material layer is in a range of 100 to 10000 nm, and more preferably, in a range of 100 to 1000 nm. To reduce optical loss under normal conditions, the thicknesses of these layers preferably are as thin as possible.

The layer sequence of the light heatable material layer and the thermally sensitive degradable material layer is not limited to the above embodiments, and any one of the two layers may be positioned at the beam entering side. In a light-reflection-type optical fuse, the light heatable material layer, which is a metal layer with high reflectance (for example, Al), may be positioned at the beam entering side.

In the optical fuse complex with the base, the base preferably is formed of a transparent material such as glass, quartz, or fluorite. When the optical fuse is directly attached to the beam entering side or to the beam output side, the end of the optical fiber attached to the fuse works as the base. When the optical fuse material is fed and solidified directly between the beam entering side and the beam output side, the base is unnecessary.

As shown in FIG. 8, a plurality of the light heatable material layers 12 and a plurality of the thermally sensitive degradable material layers 11 may be alternatively stacked, and this layered body is disposed on the base 13, forming an optical fuse complex 44.

Figure 9:
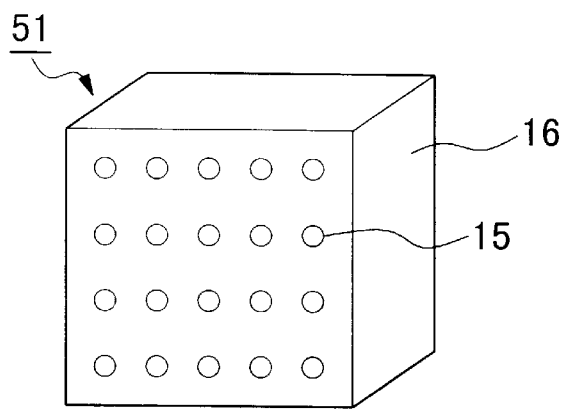
FIG. 9 is a perspective view showing a modified example of the optical fuse of the first embodiment of the present invention.

In FIG. 9, spots of light heatable portions 15 which contain the light heatable material may be patterned as desired on a thermally sensitive degradable film 16 containing the thermally sensitive degradable material. The shapes, sizes, patterns, and distances of the spots may be appropriately modified.

Figure 10:
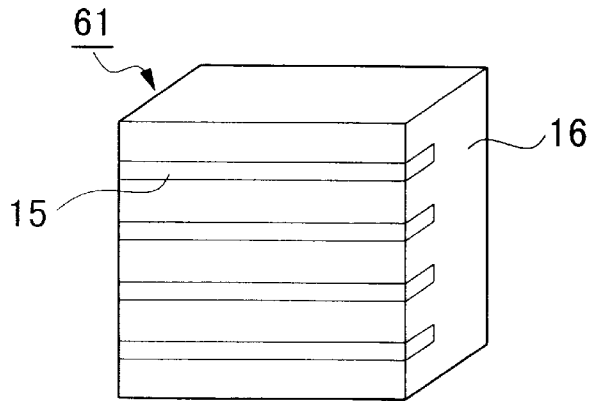
FIG. 10 is a perspective view showing a modified example of the optical fuse of the first embodiment of the present invention.

Alternatively, as shown in FIG. 10, the light heatable portions 15 may be strips arranged on the thermally sensitive degradable film 16. The strip light heatable portions 15 may be straight, wavy, or zigzags. The sizes, patterns, and distances of the strips may be appropriately modified.

Figure 11:
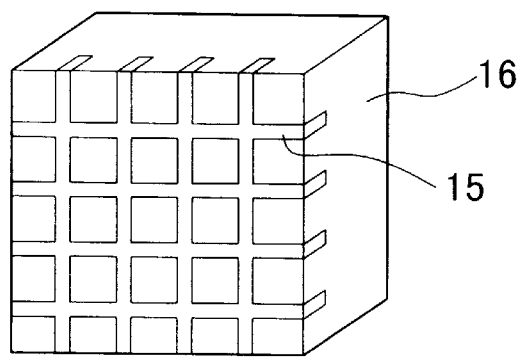
FIG. 11 is a perspective view showing a modified example of the optical fuse of the first embodiment of the present invention.

Alternatively, as shown in FIG. 11, the light heatable portion 15 may have, for example, a grid shape as desired on the thermally sensitive degradable film 16. The shape of the light heatable portion 15 is not limited to a grid shape, and may form other shapes such as a mesh shape. The shapes, sizes, and positions of the grids may be appropriately modified.

Although, in the optical fuse shown in FIGS. 9, 10, and 11, the light heatable portions causes a small optical loss to beam with a low light intensity, the total optical loss can be reduced, because the areas of the thermally sensitive degradable portions are large and the optical loss due to light absorption by the theremo-sensitive degradable portions becomes low. In addition, by changing the shapes, sizes, and patterns of the light heatable portion, the threshold value of the optical fuse can be adjusted in consideration of the light surge to be controlled.

Figure 12:
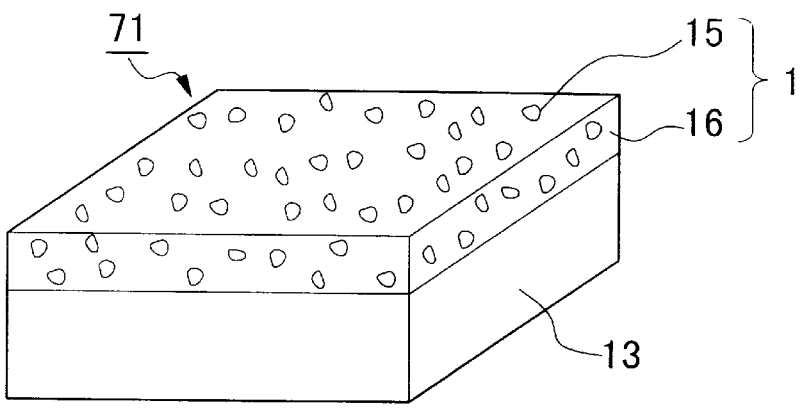
FIG. 12 is a perspective view showing a modified example of the optical fuse of the first embodiment of the present invention.

In FIG. 12, the light heatable portions 15 may be a number of particles of the light heatable material, which are distributed in the thermally sensitive degradable portion 16. This optical fuse 1 may be layered on the base 13, forming an optical fuse complex 71. The sizes, shapes, distribution density, and distribution range of the light heatable portions 15 may be appropriately determined. To manufacture the optical fuse of FIG. 12, a two-source deposition device may be used. While the thermally sensitive degradable material (dielectric material) is evaporated at a high evaporation rate from one evaporation source to the base, the light heatable material (metal, or semiconductor) is evaporated at a low evaporation rate from the other evaporation source, thus diffusing the particles of the light heatable material into the evaporated layer of the thermally sensitive degradable material. Alternatively, a sol-gel film which contains the light heatable material and the thermally sensitive degradable material may be heated, depositing the light heatable material (for example, metal) in clusters.

Second Embodiment

The optical fuse of the second embodiment according to the present invention, comprises a dielectric metal compound containing metal atoms and an organic group combined therewith and having transparency and reflectivity. The metal atoms generate heat, depending on the specified light intensity of incident beam, and degenerate or decompose the dielectric metal compound, which loses or reduces its transparency and reflectivity.

The dielectric metal compound may be a complex compound of metal atoms with the organic group. The metal atom may be Al, Pd, Ge, or In which absorb light at predetermined wavelengths and generate heat. The complex compound may be Pd complex with polyvinyl alcohol (hereinafter referred to as Pd-PVA), Ge complex with phthalocyanine, Cl In complex with phthalocyanine, Mo complex with phthalocyanine, Ni complex with phthalocyanine, Mn complex with phthalocyanine, Pt complex with phthalocyanine, Ti complex with phthalocyanine, V complex with phthalocyanine, Cu complex with phthalocyanine, or Si complex with a copolymer of phthalocyanine-methyl methacrylate. The optical fuse of the second embodiment may be a film with a single layer.

Figure 13:
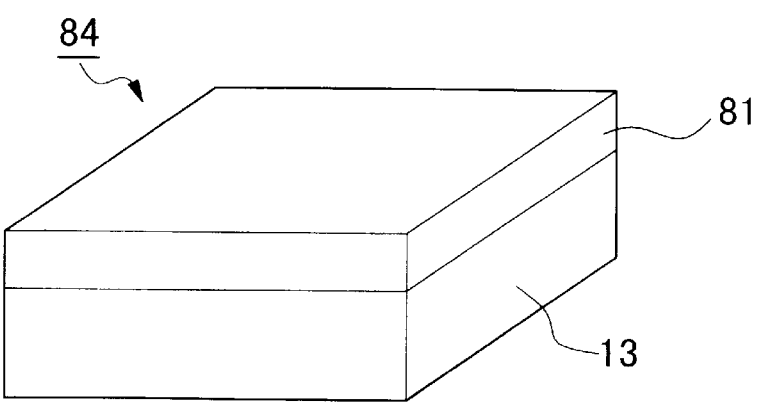
FIG. 13 is a perspective view showing the optical fuse of the second embodiment of the present invention.

The second embodiment of the optical fuse utilizes a thermally sensitive degradable organic material, for example, a thermally sensitive organometallic compound such as complex in which, for example, metal atoms of the light heatable material are introduced into a dielectric organic material. The complex absorbs the light beam, generates heat, and is degraded, converted, or decomposed, reducing or losing its transparency or reflectivity. FIG. 13 shows the second embodiment of the optical fuse 81 of a single layer, which may be stacked on a base 13, forming an optical fuse complex 84 if necessary.

Figure 14:
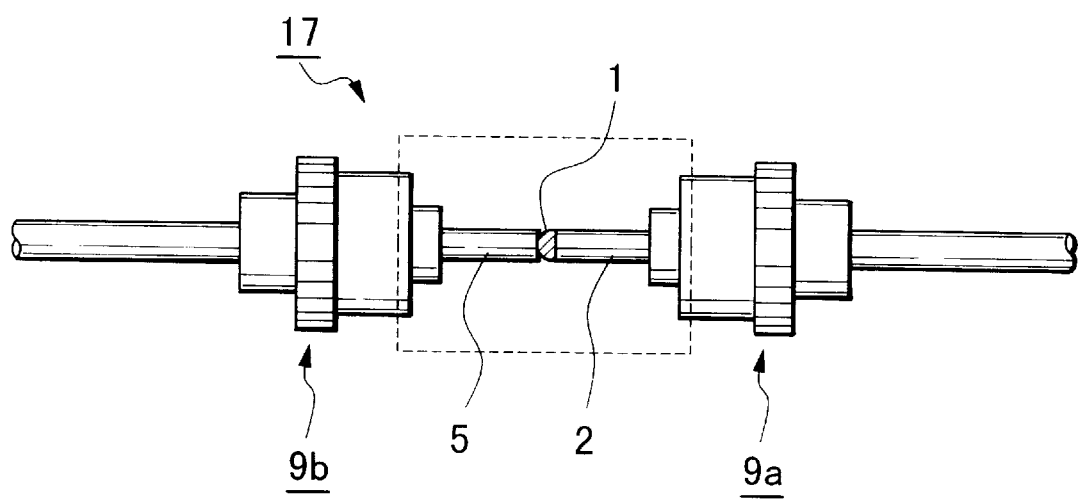
FIG. 14 is a side view showing an evaluator for measuring performance of the optical fuse of the present invention.
Figure 15:
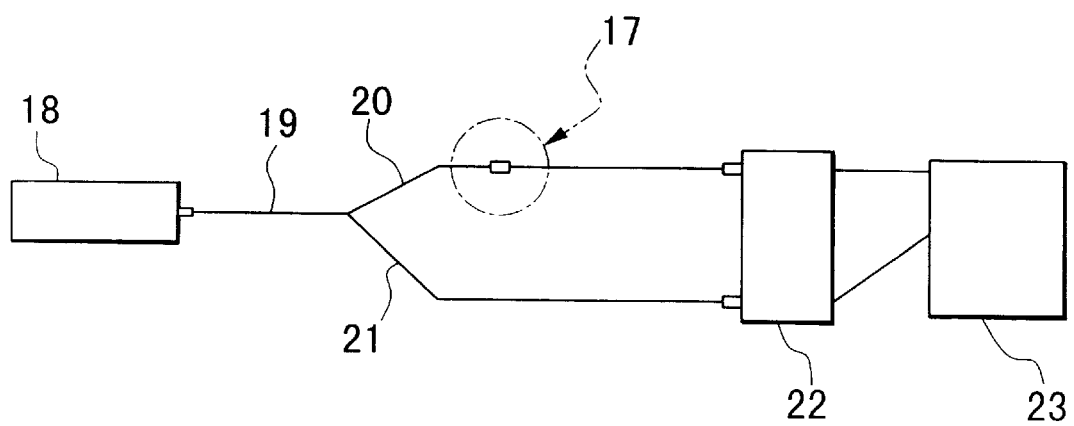
FIG. 15 is a diagram showing an optical measurement system which includes the evaluator of FIG. 14 of the present invention.

FIGS. 14 and 15 show a characteristic evaluator for the light-transmission-type optical fuse. In FIG. 14, the optical fuse is positioned between the optical fibers 2 and 5 facing each other in the evaluator 17. A Pd-PVA solution is applied to one of the ends of the optical fibers, and is dried and solidified at a room temperature all day, forming a film optical fuse with thickness of 5 $\mu$m. Subsequently, the other end of the optical fiber is disposed to face the optical fuse, and the fibers are connected to each other by a connector joint, thus forming an optical system. The optical fuse film is in contact with the ends of the optical fibers 2 and 5.

In the optical measurement system shown in FIG. 15, a laser source 18 which emits a laser beam at a wavelength of 1.19 $\mu$m is connected to an optical fiber 19 in which the laser beam travels. The optical fiber 19 is branched at a coupler (not shown) to input 99% of the incident laser beam into a branched optical fiber 20 and to input 1% of the incident laser beam into another branched optical fiber 21 for monitoring the light intensity of the incident beam. The branched optical fiber 20 is connected to a measurement device 17 which includes the optical fuse shown in FIG. 19. The branched optical fibers 20 and 21 are connected to a power meter 22 and an x-y plotter 23. The light intensities of the beam entering the optical fuse and of the beam leaving the optical fuse are measured while changing the output from the laser source.

Figure 16:
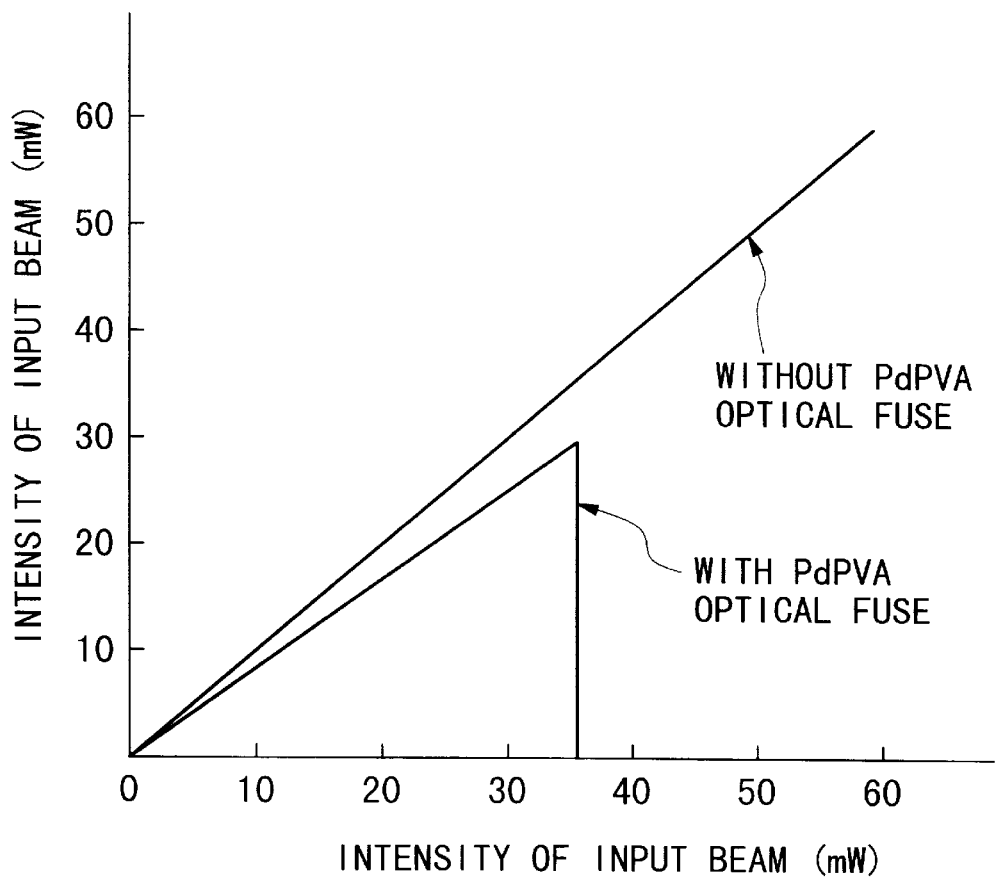
FIG. 16 is a graph showing the performance of the optical fuse of the present invention.

FIG. 16 shows the results of the measurements, and is a graph showing the relationship between the light intensities of the beam entering the optical fuse to and the beam leaving the optical fuse. The abscissa represents the light intensity of the entering beam, and the ordinate represents the light intensity of the leaving beam. The graph shows a comparative example which does not include Pd-PVA optical fuse. When the Pd-PVA optical fuse is set between the fibers, an optical fusing action is found for a light intensity of the entering beam of 36 mW. The threshold value which causes the optical fusing action may be adjusted by changing the film thickness and the film processing conditions (for example, the solidification temperature).

Third Embodiment

Figure 17:
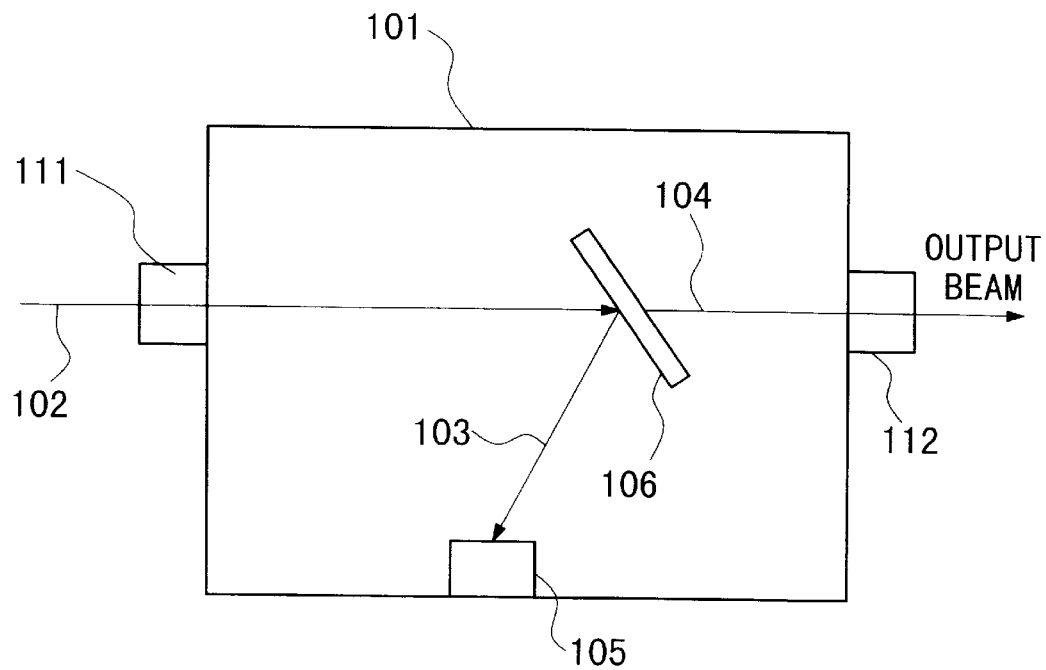
FIG. 17 is a diagram showing the optical fuse system of the third embodiment of the present invention.

FIG. 17 shows the structure of the optical system using the optical fuse of a third embodiment according to the present invention. The optical fuse system 101 has a light input device 111 for inputting the signal beam 102 and a light output device 112 for outputting the signal beam 102. The light input device 111 and the light output device 112 are disposed on the same optical axis.

A film 106 is provided on the optical axis of the input signal beam 102 between the light input device 111 and the light output device 112, and is inclined with respect to the optical axis at a predetermined angle. The angle of the film 106 is adjusted so as to set the transparency to above 90 percent and the reflectance to several percent. Most of the entering signal beam 102 may be transmitted through the film 106 and is output as a transmitted beam from the beam output device 112.

Reference numeral 105 denotes a photo detector which receives beam 103 reflected by the film 106. The film 106 irreversibly changes its transparency and reflectivity when the intensity (power) of the incident beam exceeds a predetermined value. That is, the film 106 reduces its transparency to several percent and slightly increases its reflectivity in response to the incident beam with an excessive intensity (power).

Figure 18:
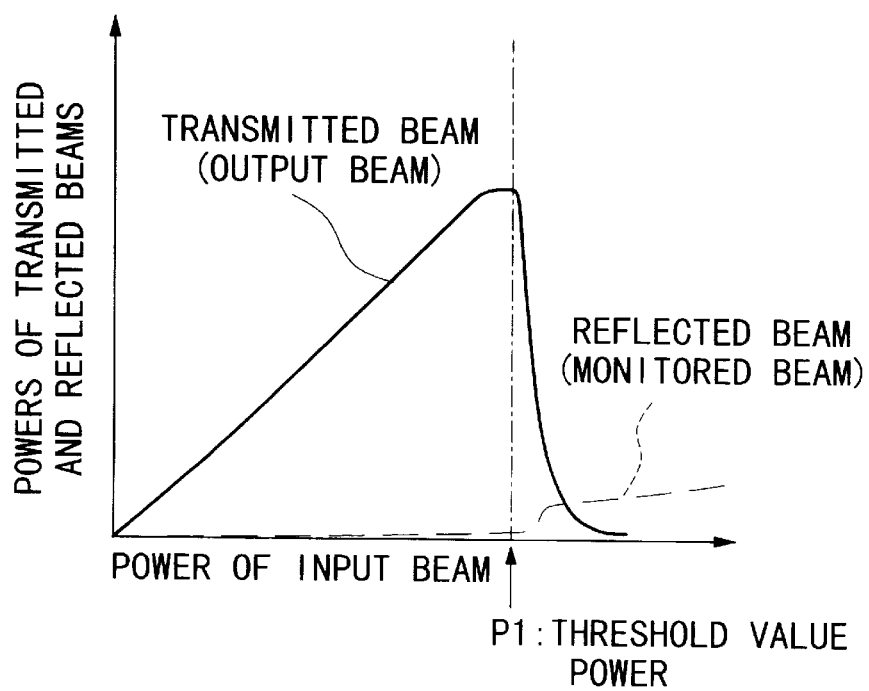
FIG. 18 shows the relationship between an intensity of a beam input to a light input device, an intensity of a beam output from a light output device, and an intensity of a reflected beam detected by the photo detector.

The operation of the optical fuse of the first embodiment of FIG. 17 will be explained. FIG. 18 shows the relationship between the intensity of the beam input to the light input device 111, the intensity of the beam output from the light output device 112, and the intensity of the reflected beam 103 detected by the photo detector 105.

In FIG. 18, reference character P1 represents a threshold intensity value at which the transparency and the reflectivity are sharply changed. When a signal beam 102 of less than the threshold value P1 enters the light input device 111, the light output device 112 outputs most of the beam while the intensity of the reflected beam received by the photo detector is low.

When the signal beam 102 of more than the threshold value P1 enters the light input device 111, the transparency of the film 106 is sharply reduced so that the light output device 112 outputs little of the beam while the intensity of the reflected beam detected by the photo detector is increased because the reflectivity of the film is slightly increased.

In the optical system of the third embodiment, in response to the input of a signal beam with an intensity of more than the predetermined value, the transparency of the film 106 is reduced, to intercept the signal beam, decreasing the output of the light surge, and preventing a subsequent optical device (not shown) from being damaged.

While the optical fuse intercepts the signal before it is output in response to the input of the signal beam with intensity of more than the predetermined value, the reflectivity of the film 106 is increased, and the intensity of the reflected beam 103 is increased. The photo detector 105 detects the increased intensity of the reflected beam, and a user can know that the optical fuse system 101 should be exchanged, based on the interception of the output from the optical fuse system.

The present inventor manufactured the optical fuse system 101 and conducted the experiment, which is described below. The light input device 111 and the light output device 112 are distributed shift fibers (DSF), and the photo detector 105 is a InGaAs-PIN photo diode. The film 106 has a multi-layered structure of $SiO_2/TiO_2$ formed onto a glass substrate by deposition. The light output device 112 is located to the beam output side of the film 106. The transparency of the film 106 is 99.0 percent, and the reflectivity is 1 percent.

In response to the normal signal beam 102 at a wavelength of 1.55 $\mu$m and intensity (power) of 0.8 W, the film 106 does not change its transparency and reflectivity. The insertion loss of the optical fuse 101 is 3 dB, and the intensity of the reflected beam is 0.01 mW.

When a signal beam whose peak intensity of a light surge is 3 W enters the optical fuse 101, a beam with a peak intensity of a light surge of 1 W is output. Subsequently, when a signal beam of 0.8 W is input, the insertion loss is increased to 15 dB, and the intensity of the reflected beam is increased to 0.05 mW. These results confirm that the film 106 changes its transparency and reflectivity irreversibly and intercepts the signal beam because of the light surge.

Fourth Embodiment

Figure 19:
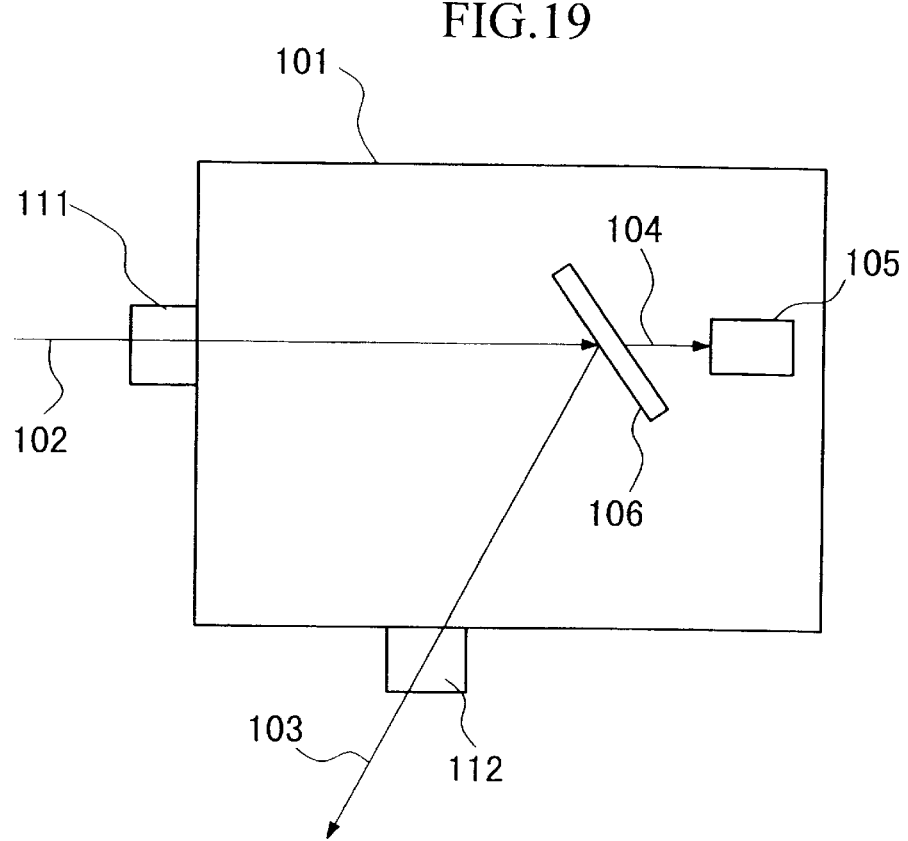
FIG. 19 is a diagram showing the optical fuse system of the fourth embodiment of the present invention.

FIG. 19 shows the structure of an optical fuse system of the fourth embodiment according to the present invention. The fourth embodiment differs from the third embodiment only insofar as a light output device 112 receives a beam reflected by a film 106 and that the photo detector 105 is disposed on an optical axis of the signal beam 102 and receives the beam transmitted through the film 106.

While the film 106 employed in the fourth embodiment is similar to that in the third embodiment, the angle of the film 106 is set to a total reflection angle with respect to the optical axis of the incident signal beam 102. That is, the transparency and the reflectance of the fourth embodiment differ from those of the third embodiment.

Although the film 106 has characteristics similar to those shown in FIG. 18, the film 106 is disposed so as to set the reflectance to 90 percent and the transparency to several percent. When the input signal beam 102 is below the intensity threshold value P1, the intensity of the reflected beam 103 is increased in proportion to the increased intensity of the input signal beam. When the input signal beam 103 is above the intensity threshold value P1, the reflectance is reduced and the transparency is slightly increased.

Because the optical axes of the input beam 102 and of the output beam 103 are different, the optical fuse of the second embodiment is advantageous when the optical axes cannot be arranged in a straight line. Further, because the photo detector 105 detects the beam transmitted through the film 106, a user can know that the optical fuse 101 should be exchanged, based on the interception of the signal from the optical fuse 101.

Fifth Embodiment

Figure 20:
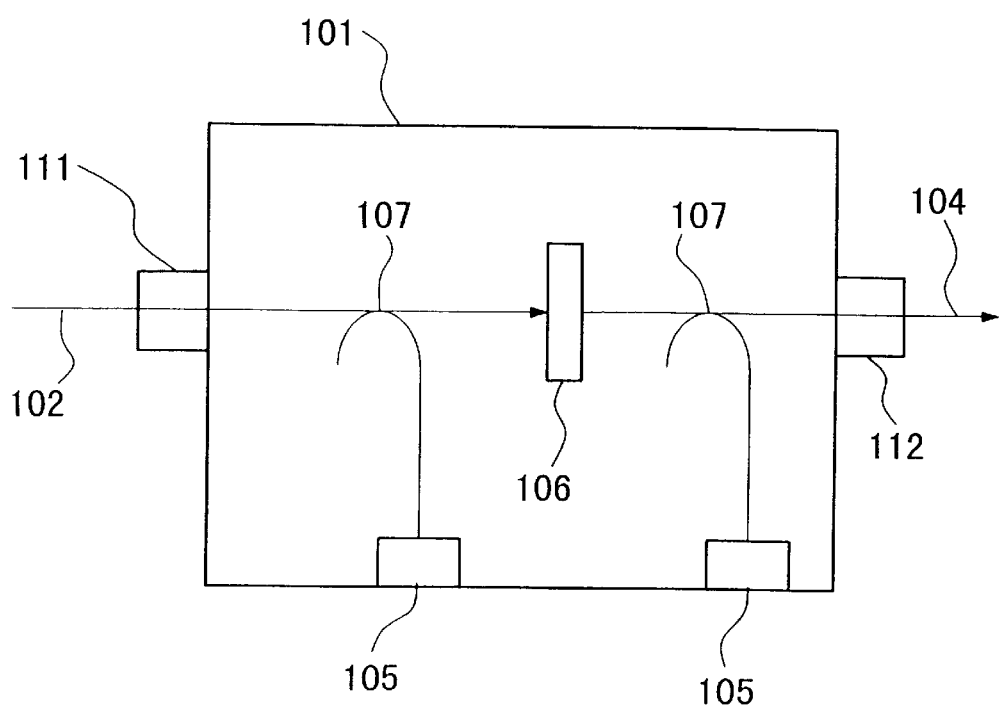
FIG. 20 is a diagram showing the optical fuse system of the fifth embodiment of the present invention.

FIG. 20 shows the structure of an optical fuse system using the optical fuse of the fifth embodiment according to the present invention. One difference between the third embodiment and the fifth embodiment is that the film 106 is not inclined with respect to the optical axis of a signal beam 102. Another difference is that photo couplers 107 intervene between the light input device and the film 106 and between the film 106 and the light output device 112 and are connected to the photo detectors 105.

In the fifth embodiment, the film 106 must reduce its transparency to close the transmission path when a light surge enters the film 106, and the reflection characteristic is not important.

The photo detectors 105 detect the signal beam 102 from the light input device 111 and the beam transmitted through the film 106. That is, the photo detectors 105 monitor the input and output beams through the optical fuse. When the normal signal beam enters the optical fuse, the photo detectors 105 detect both beams. When the transmission path is closed in response to the light surge entering the optical fuse, the input side photo detector detects the beam while the output side photo detector detects no beam. Thus, by monitoring the outputs from the photo detectors 105, a user can know that the optical fuse has closed the transmission path. Because the branching ratios of the photo couplers 7 are high, the photo detectors are prevented from being damaged when a light surge enters the optical fuse.

Sixth Embodiment

Figure 21:
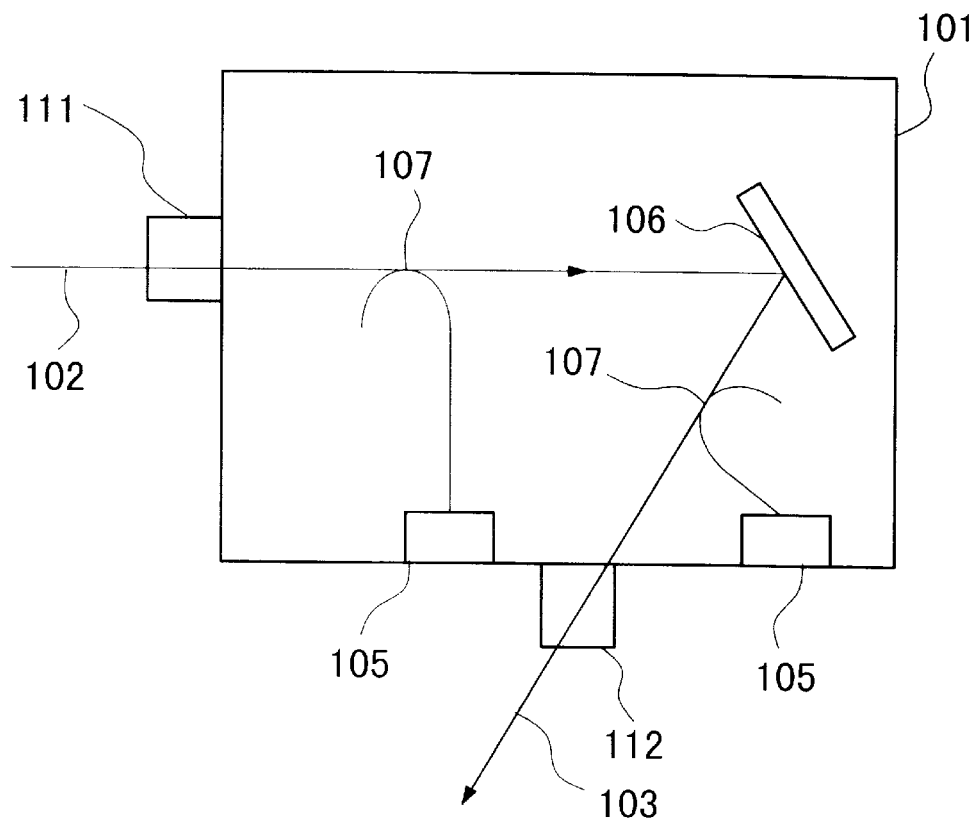
FIG. 21 is a diagram showing the optical fuse system of the sixth embodiment of the present invention.
Figure 22:
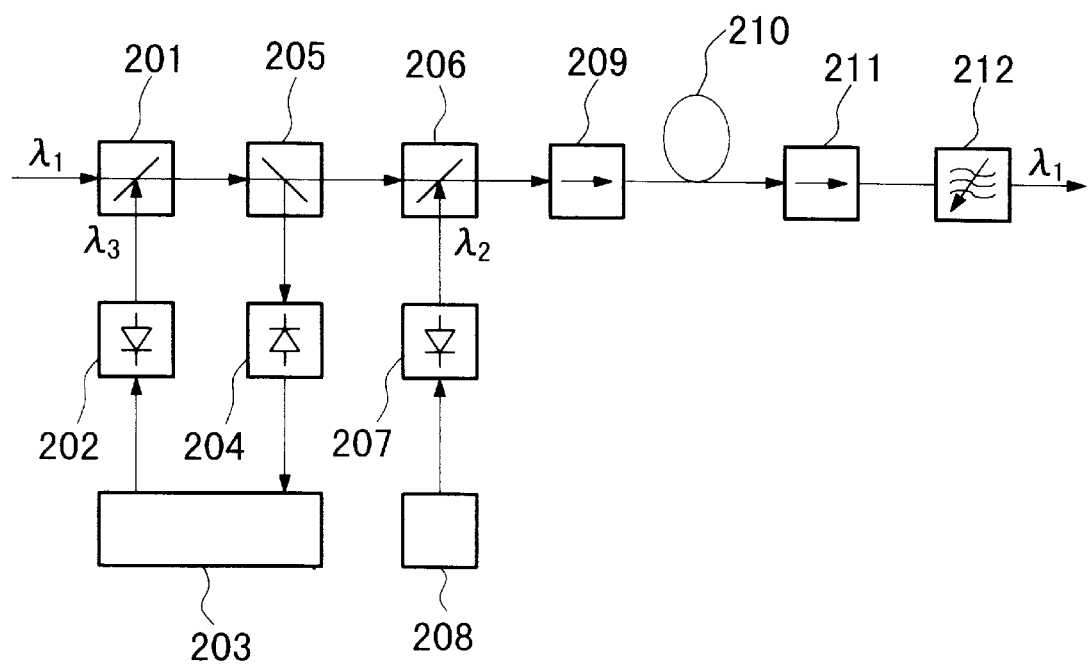
FIG. 22 is a block diagram showing the background art.

FIG. 21 shows the structure of an optical fuse system of the sixth embodiment according to the present invention. The sixth embodiment differs from the fifth embodiment only insofar as the film 106 is inclined at a predetermined angle with respect to an optical axis of a signal beam 102, the light output device 112 is disposed so as to receive the signal beam 102 entering and reflected by the film 106, and the photo detector 107 is disposed depending on the position of the light output device 112. That is, the photo coupler 107 is disposed between the film 106 and the light output device 112 and on an optical axis of the reflected beam (output beam) 103.

In the sixth embodiment, the film 106 must reduce its reflectance to close the transmission path, and the transparency of the film 106 is not important. In a manner similar to the fifth embodiment, the photo detectors 105 detect the signal beam 102 input from the light input device 111 and the beam reflected by the film 106. That is, the photo detectors 105 monitors the input and output beams through the optical fuse. When a normal signal beam enters the optical fuse, the photo detectors 105 detect both beams. When the transmission path is closed in response to a light surge entering the optical fuse, the input side photo detector detects the beam while the output side photo detector detects no beam. Thus, by monitoring the outputs from the photo detectors 105, a user can know that the optical fuse has closed the transmission path. Because the branching ratios of the photo couplers 7 are high, the photo detectors are prevented from being damaged when a light surge enters the optical fuse.

While in the above embodiments the film 106 is a multi-layered structure of $SiO_2/TiO_2$, the present invention is not limited to these embodiments, and $MgF_2$, Ce, Si, Ge, and oxide (dielectric material) thereof may be deposited.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. An optical fuse, comprising:
   at least one light heatable portion for receiving an incident beam, said light heatable portion containing a light heatable material which generates heat depending on a predetermined light intensity of the incident beam; and
   at least one thermally sensitive degradable portion with transparency and reflectivity, positioned in contact with said light heatable portion, said thermally sensitive degradable portion containing a thermally sensitive degradable material which loses or reduces its transparency or increases its reflectivity, depending on the heat generated by said light heatable portion when the light intensity of the incident beam exceeds a threshold value.

2. An optical fuse according to claim 1, wherein the light heatable material is a metal or semiconductor.

3. An optical fuse according to claim 1, wherein the thermally sensitive degradable material is a dielectric.

4. An optical fuse according to claim 1, wherein said light heatable portion and said thermally sensitive degradable portion are films, and are alternately layered, forming an integrated layered film body.

5. An optical fuse according to claim 1, wherein said light heatable portions are a plurality of spots, said thermally sensitive degradable portion is a film, and the spots of the light heatable portions are patterned on said film thermally sensitive degradable portion.

6. An optical fuse according to claim 1, wherein said light heatable portions are a plurality of strips, said thermally sensitive degradable portion is a film, and the strips of the light heatable portions are patterned on said film thermally sensitive degradable portion.

7. An optical fuse according to claim 1, wherein said light heatable portion is a film with a predetermined pattern, said thermally sensitive degradable portion is a film, and said light heatable portion is patterned on said film thermally sensitive degradable portion.

8. An optical fuse according to claim 1, wherein said light heatable portions are a plurality of particles distributed in said thermally sensitive degradable portion.

9. An optical fuse complex wherein the optical fuse of claim 1 is supported on a base.

10. An optical fuse system wherein the light heatable portion of the optical fuse of claim 1 faces an input beam transmitter, and the thermally sensitive degradable portion of the optical fuse faces an output beam transmitter.

11. An optical fuse system wherein the light heatable portion of the optical fuse of claim 1 faces both an input beam transmitter and an output beam transmitter.

12. An optical fuse, comprising:
   a dielectric metal compound containing metal atoms and an organic group combined therewith and having transparency and reflectivity, said metal atoms generating heat depending on a predetermined light intensity of an incident beam, degenerating or decomposing said dielectric metal compound so as to lose or reduce its transparency or increase its reflectivity.

13. An optical fuse complex wherein the optical fuse of claim 12 is supported on a base.

14. The optical fuse according to claim 12, further comprising a light heatable portion and a thermally sensitive portion, wherein the light heatable portion of the optical fuse faces an input beam transmitter, and the thermally sensitive degradable portion of the optical fuse faces an output beam transmitter.

15. The optical fuse according to claim 12, further comprising a light heatable portion and a thermally sensitive portion, wherein the light heatable portion of the optical fuse faces both an input beam transmitter and an output beam transmitter.

16. An optical fuse system, comprising:
   a light input device for inputting a beam;
   an optical fuse inclined with respect to an optical axis of the beam input from said light input device at a predetermined angle, a transparency and a reflectivity of said optical fuse being changed irreversibly depending on an intensity of the beam;
   a light output device for outputting the beam transmitted through said optical fuse; and
   a photo detector for detecting the beam reflected by said optical fuse,
   wherein, when the intensity of the beam exceeds a predetermined value, the transparency of said optical fuse is reduced so as to intercept the beam, and said photo detector detects change in the intensity of the beam caused by change in reflectivity of the optical fuse to determine whether the beam is intercepted.

17. An optical fuse system, comprising:
   a light input device for inputting a beam;
   an optical fuse inclined with respect to an optical axis of the beam input from said light input device at a predetermined angle, a transparency and a reflectivity of said optical fuse being changed irreversibly depending on a intensity of the beam;
   a light output device for outputting the beam reflected by said optical fuse; and
   a photo detector for detecting the beam transmitted through said optical fuse,
   wherein, when the intensity of the beam exceeds a predetermined value, the reflectivity of said optical fuse is reduced so as to intercept the beam, and said photo detector detects a change in the intensity of the beam caused by the change in transparency of the optical fuse to determine whether the beam is intercepted.

18. An optical fuse system, comprising:
   a light input device for inputting a beam;
   an optical fuse whose transparency is changed irreversibly depending on an intensity of the beam;
   a light output device outputting the beam transmitted through said optical fuse; at least one photo coupler provided between said optical fuse and said light output device; and
   a photo detector for detecting the beam branched by said photo coupler,
   wherein, when the intensity of the beam exceeds a predetermined value, the transparency of said optical fuse is reduced so as to intercept the beam, and said photo detector detects a change in the intensity of the beam caused by the change in transparency of the optical fuse to determine whether the beam is intercepted.

19. An optical fuse system, comprising:
   a light input device for inputting a beam;
   an optical fuse inclined with respect to an optical axis of the beam input from said light input device at a predetermined angle, the reflectivity of said optical fuse being changed irreversibly depending on the intensity of the beam;
   a light output device for outputting the beam reflected by said optical fuse;
   at least one photo coupler provided between said optical fuse and said light output device; and
   a photo detector for detecting the beam branched by said photo detector,
   wherein, when the intensity of the beam exceeds a predetermined value, the reflectivity of said optical fuse is reduced so as to intercept the beam, and said photo detector detects a change in the intensity of the beam caused by change in reflectivity of the optical fuse to determine whether the beam is intercepted.

20. An optical fuse system according to any one of claims 16 to 19, wherein said optical fuse is a film formed by depositing a dielectric material onto a glass substrate.

* * * * *